(12) United States Patent
Siohan et al.

(10) Patent No.: US 7,609,611 B1
(45) Date of Patent: Oct. 27, 2009

(54) METHOD FOR TRANSMITTING AN OFFSET MODULATED BIORTHOGONAL MULTICARRIER SIGNAL (BFDM/OM)

(75) Inventors: Pierre Siohan, Rennes (FR); Cyrille Siclet, Besancon (FR)

(73) Assignees: France Telecom, Paris (FR); TDF, Paris (FR)

( * ) Notice: Subject to any disclaimer, the term of this patent is extended or adjusted under 35 U.S.C. 154(b) by 1393 days.

(21) Appl. No.: 10/089,026

(22) PCT Filed: Sep. 29, 2000

(86) PCT No.: PCT/FR00/02716

§ 371 (c)(1),
(2), (4) Date: Jul. 2, 2002

(87) PCT Pub. No.: WO01/24470

PCT Pub. Date: Apr. 5, 2001

(30) Foreign Application Priority Data

Sep. 29, 1999 (FR) .................................. 99 12371

(51) Int. Cl.
*H04J 11/00* (2006.01)
(52) U.S. Cl. ................... 370/208; 370/210; 375/260
(58) Field of Classification Search .................. None
See application file for complete search history.

(56) References Cited

U.S. PATENT DOCUMENTS

| | | | |
|---|---|---|---|
| 4,959,863 A * | 9/1990 | Azuma et al. ............... 704/272 |
| 5,715,280 A * | 2/1998 | Sandberg et al. ............ 375/260 |
| 5,754,794 A * | 5/1998 | Bernardini et al. .......... 709/247 |
| 6,018,753 A * | 1/2000 | Kovacevic et al. .......... 708/313 |
| 6,252,535 B1 * | 6/2001 | Kober et al. ................ 341/155 |
| 6,252,909 B1 * | 6/2001 | Tzannes et al. ............. 375/260 |
| 6,466,957 B1 * | 10/2002 | Messerly et al. ............ 708/300 |
| 7,099,396 B1 | 8/2006 | Combelles et al. .......... 375/260 |

FOREIGN PATENT DOCUMENTS

| FR | 2 765 757 | | 8/1999 |
| WO | WO 98/09383 | * | 5/1998 |

OTHER PUBLICATIONS

"Design of Pulse Shaping OFDM/OQAM Systems for High Data-Rate Transmission Over Wireless Channels" by H. Bolcskei et al., IEEE XP-002139687, pp. 559-564, 1999.

(Continued)

*Primary Examiner*—Bob A Phunkulh
(74) *Attorney, Agent, or Firm*—David D. Brush; Westman, Champlin & Kelly P.A.

(57) ABSTRACT

The invention concerns a method for transmitting a biorthogonal multicarrier signal BFDM/OM, using a transmultiplexer structure providing: a modulating step, using a synthesis filter bank (11), having two 2M parallel branches, M≧2, each supplied by source data, and comprising an expander of order M and filtering means; a demodulating step, using an analysis filter bank (12), having two 2M parallel branches, each comprising a decimation unit of order M and filtering means, and delivering received data representing said source data; said filtering means being derived from a predetermined prototype modulating function.

16 Claims, 8 Drawing Sheets

OTHER PUBLICATIONS

"Performance Analysis of Multicarrier Modulation Systems Using Cosine Modulated Filter Banks" by S. Govardhanagiri et al., IEEE XP-002139688, pp. 1405-1408, 1999.

"Identification Techniques for the Design of Cascade Forms Perfect-Reconstruction Two-Channel Filter Banks" by H. LeBihan et al., IEEE XP-000529913, pp. 111-189-111-192, 1994.

"Orthogonal Transmultiplexers in Communication: A Review" by A. Akansu, et al., IEEE XP-000770957, pp. 979-995, 1998.

"M-Channel Filter Banks", IEEE XP-002139689, pp. 301-303, 304, 307, 309, 325-331, 391-392, 1996.

"An OFDM System with a Half Complexity" by G. Cariolaro, IEEE XP-00048850, pp. 237-242, 1994.

P.N. Heller et al., "A General Formulation of Modulated Filter Banks," IEEE Transactions on Signal Processing, vol. 47, No. 4, Apr. 1999, pp. 986-1002.

B. LeFloch et al., "Coded Orthogonal Frequency Division Multiplex," Proceedings of the IEEE, vol. 83, No. 6, Jun. 1995, pp. 982-996.

Anders Vahlin et al., "Optimal Finite Duration Pulses for OFDM," IEEE Transactions on Comm., vol. 44, No. 1, Jan. 1996, pp. 10-14.

R.D. Koilpillai, "Cosine-Modulated FIR Filter Banks Satisfying Perfect Reconstruction," IEEE Transactions on Signal Processing, vol. 40, No. 4, Apr. 1992, pp. 770-783.

T.Q. Nguyen, "The Theory and Design of Arbitrary-Length Cosine-Modulated Filter Banks and Wavelets, Satisfying Perfect Reconstruction," IEEE Transactions on Signal Processing, vol. 44, No. 3, Mar. 1996, pp. 473-483.

\* cited by examiner

METHOD FOR TRANSMITTING AN OFFSET MODULATED BIORTHOGONAL MULTICARRIER SIGNAL (BFDM/OM)

CROSS-REFERENCE TO RELATED APPLICATION

This application is a Section 371 National Stage application of International Application No. PCR/FR00/02716 filed Sep. 29, 2000 and published Apr. 5, 2001 as WO 01/24470, not in English.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

FIELD OF THE INVENTION

The field of the invention is that of the transmission of digital signals, based on multicarrier modulations. More specifically, the invention relates to the transmission, and notably to the modulation and demodulation of biorthogonal multicarrier signals (Biorthogonal Frequency Division Multiplex/Offset Modulation (BFDM/OM)).

BACKGROUND OF THE INVENTION

For several years, multicarrier modulations have aroused large interest. This is in particular justified in the case of mobile phone communications, where their effectiveness has already been demonstrated for broadcasting radio signals, with, first of all, the Digital Audio Broadcasting system (DAB) [1] (for the sake of simplification and legibility, all references mentioned in the present description have been grouped in Appendix E) but also in high rate transmissions over telephone two-wire lines with ADSL (Asymmetric Digital Subscriber Line) and VDSL (Very high bit rate Digital Subscriber Line) systems [2]

In the usual multicarrier modulation schemes, a set of carrier frequencies selected in order to meet time and frequency orthogonality conditions, is multiplexed. This is the so-called Orthogonally Frequency Division Multiplex (OFDM).

A modulation without any offset (Synchronous Modulation) (SM) or with an offset (Offset Modulation) (OM) may be associated with each of the carriers. This now results in the OFDM/SM and OFDM/OM systems, respectively. In particular, by associating a quadrature amplitude modulation, with or without any offset, with each of the carriers, OFDM/QAM (Quadrature Amplitude Modulation) and OFDM/OQAM (Offset QAM) modulations are produced respectively. This latter modulation operates without any guard interval and also provides a wider possibility of choice as regards the prototype function [3], [4].

However, optimality of OFDM is only ensured by its orthogonality, in the case of transmission channels which may be assimilated with additive white and gaussian noise. In all other cases, OFDM's optimality is not guaranteed.

From this point of view, biorthogonal multicarrier modulations (BFDM) provide further possibilities and in particular they may be a better compromise with regards to mobile radio phone type channels which are dispersive in both time and frequency [5].

Furthermore, with an offset biorthogonal modulation (BFDM/OM), the advantage of OFDM/OM may be retained with the possibility of obtaining prototype functions well localized in time and in frequency.

As an indication, a short reminder of the essential definitions relating to the mathematical aspects related to modulations of the BFDM/OM type is given in Appendix A. These aspects have already been the object of publications, with the designation BFDM/OFDM, also retained in the appendices of the present description.

A discretization technique for BFDM/OM modulation systems has already been suggested in a recently submitted article [6]. However, the approach described in [6], [7] is essentially based on discretization of continuous equations which extend the formalism introduced in the continuous domain to the discrete domain, in reference [4] for OFDM/OM.

For OFDM/OM, the use of a mathematical transform and of the reverse transform (conventionally $FFT^{-1}$ then FFT) is therefore assumed. The discretized signal is then truncated.

The object of the invention is notably to provide a new technique for modulating and demodulating a BFDM/OM signal which is more effective and easier to implement as known techniques.

Thus, an object of the invention is to provide such modulation and demodulation techniques which are able to ensure theoretically, that symbol interference (IES) and channel interference (IEC) are exactly zero, on a finite support.

An object of the invention is also to provide such techniques with which devices may be made which structurally fulfil the cancellation of IES and IEC.

Another object of the invention is to provide such techniques, which provide the implementation of prototype functions, either symmetrical or not and either identical or not, both upon transmission and reception.

Still another object of the invention is to provide such modulation and demodulation techniques with which reconstruction delays may be reduced and controlled, for example for real time or interactive applications. In other words, one object is to provide such techniques with which, for prototype filters of a given length, reconstruction delays may be obtained which are not set (and which may therefore be smaller than those of OFDM/OM).

An object of the invention is also to provide such techniques which are optimum, with respect to distortions, produced by a gaussian channel and/or by non-gaussian channels which are not simply reduced to additive white gaussian noise.

Still another object of the invention, is to provide such techniques, with which higher performances, as compared with known techniques, may be obtained, in terms of localization of the transform.

An object of the invention is also to provide modulation and/or demodulation and more generally devices for transmitting and/or receiving signals, which are easy and not very expensive to make and implement.

SUMMARY OF THE INVENTION

These objects as well as others which will be apparent later on, are achieved according to the invention by means of a method for transmitting a biorthogonal BFDM/OM multicarrier signal, which implements a transmultiplexer structure providing:
- a modulation step, by means of a bank of synthesis filters having 2M parallel branches, M≧2, each fed with source data and each comprising an expander of order M and filtering means;
- a demodulation step, by means of a bank of analysis filters, having 2M parallel branches, each comprising a decimator of order M and filtering means and delivering representative data received from said source data, said filtering means being derived from a predetermined prototype modulation function.

In other words, the invention provides a new realization of BFDM/OM modulation systems, based on a novel description of a modulation system, as a transmultiplexer, subsequently called a modulated transmultiplexer. As it will be apparent later on, this technique has many advantages, both in terms of embodiments and effectiveness of the processing operations, and notably for cancelling IES and IEC.

It shall be noted that such a modulated transmultiplexer structure, providing transmission of an offset modulated multicarrier signal is highly different from the structures of prior art transmultiplexers. Indeed, known schemes of transmultiplexers have decimation-expansion factors more than or equal to the number of implemented sub-bands as described, for example, in the textbook "Wavelets and Filter Banks" of G. Strand and T. Nguyen (Wellesley Cambridge Press, Wellesley, Mass., USA-1996). On the other hand, with the approach of the invention consisting of implementing on each of the branches of the filter banks, filtering means derived from a predetermined prototype modulation function, a number of sub-bands may be obtained which is larger than (double) the expansion and decimation factor.

Furthermore, as compared with prior art transmultiplexers, such a modulated transmultiplexer structure according to the invention has the advantage of providing a wide selection of prototype filters.

Preferentially, said filtering means of said bank of synthesis filters and/or of said bank of analysis filters are grouped as a polyphase matrix, respectively.

Practically, this provides simplification of the operating complexity of the transmultiplexer.

Advantageously, at least one of said polyphase matrices comprises a reverse Fourier transform with 2M inputs and 2M outputs. The inventors have actually shown that by using such a transform, for which algorithms are available (IFFT), the realization and the implementation of the invention may be highly simplified.

The invention also relates to the method for modulating a signal transmitted according to the transmission method described above. Such a modulation method advantageously implements a reverse Fourier transform fed by 2M source data each having undergone a predetermined phase shift and feeding 2M filtering modules, each followed by an expander of order M, the outputs of which are grouped and then transmitted.

The modulation algorithm may then deliver data s[k] such that:

$$x_m^0(n) = a_{m,n} e^{j\frac{\pi}{2}n}$$

$$x_l^1(n) = \sqrt{2} \sum_{k=0}^{2M-1} X_K^0(n) e^{-j\frac{2\pi}{2M}l\frac{D-M}{2}} e^{j\frac{2\pi}{2M}kl}$$

$$= 2M\sqrt{2}\, IFFT\left(x_0^0(n), \ldots, x_{2M-1}^0(n) e^{-j\frac{2\pi}{2M}(2M-1)\frac{D-M}{2}}\right)$$

$$x_l^2(n) = \sum_{k=0}^{m-1} p(l+2kM) x_\lambda^1(n-2k)$$

$$s[k] = \sum_{n=\lfloor\frac{k}{M}\rfloor-1}^{\lfloor\frac{k}{M}\rfloor} x_{k-nM}^2(n)$$

wherein D=αM−β
with α an integer representing the reconstruction delay;
β an integer between 0 and M−1
and [.] is the "integral part" function.

In the same way, the invention relates to the method for demodulating a signal transmitted according to the transmission method described above. This demodulation method advantageously implements a reverse Fourier transform fed by 2M branches, themselves fed par said transmitted signal, and each comprising a decimator of order M followed by a filtering module, and feeding 2M phase shift multipliers, delivering an estimation of the source data.

The demodulation method may thus, advantageously, deliver data $a_{m,n-\alpha}$ such that:

$$\hat{x}_l'^2(n-\alpha) = s[nM-\beta-l]$$

$$\hat{x}_l'^1(n-\alpha) = \sum_{\lambda=0}^{m-1} p(l+2kM\cdot)\hat{x}_l'^2(n-\alpha-2k)$$

$$\hat{x}_l'^0(n-\alpha) = \sqrt{2}\, e^{-j\frac{2\pi}{2M}l\frac{D+M}{2}} \sum_{\lambda=0}^{2M-1} \hat{x}_l'^1(n-\alpha) e^{j\frac{2\pi}{2M}kl} =$$

$$2M\sqrt{2}\, e^{-j\frac{2\pi}{2M}l\frac{D+M}{2}} \Gamma FFT(\hat{x}_l'^1(n-\alpha), \ldots, \hat{x}_{2M-1}'^1(n-\alpha))$$

$$\hat{a}_{m,n-\alpha} = \Re\left\{e^{-j\frac{\pi}{2}(n-\alpha)} \hat{x}_l'^0(n-\alpha)\right\}$$

Advantageously, in the modulation and/or demodulation method, said filtering modules are produced in one of the forms belonging to the group comprising:
- filters with a transverse structure;
- filters with a ladder structure; and
- filters with a trellis structure.

Other filter structures may of course be contemplated, and notably structures of filters with an infinite impulse response (RII).

According to a particular embodiment, notably corresponding to the trellis structure, said biorthogonal multicarrier signal is a OFDM/OM signal. Special technical solutions may then be contemplated.

Of course, the invention also relates to the devices for transmitting and/or receiving a BFDM/OM signal, implementing the methods shown above.

BRIEF DESCRIPTION OF THE DRAWINGS

Other features and advantages of the invention will become more clearly apparent upon reading the preferred embodiments, given as simple illustrative and non-limiting examples and the appended drawings wherein.

DETAILED DESCRIPTION OF THE PREFERRED EMBODIMENTS

As shown earlier, the technique of the invention is notably based on a special approach to discretization, aiming at directly obtaining a description of the modulated transmultiplexer type system. In addition to the advantage of a more general descriptive framework, this approach provides many possibilities for utilizing connections between the banks of filters and the transmultiplexers, for optimizing the realization structures and the computation of the associated coefficients.

After having shown the general structure for representing BFDM/OM systems, as a discrete model of the transmultiplexer type, four special embodiments of the invention are shown hereafter which respectively correspond to:

two BFDM/OM embodiments which, at the modulator and the demodulator, both use a fast reverse Fourier transform algorithm (IFFT) and differ by the type of implantation of the polyphase components of the prototype filter:

Mode 1: IFFT algorithm+transverse polyphase filtering;

Mode 2: IFFT algorithm+ladder filtering.

Two embodiments adapted to OFDM/OM, derived from BFDM/OM:

Mode 3: an alternative Mode 1 verifying the discrete orthogonality of OFDM/OM with transverse polyphase filtering and the possibility of implementing a symmetrical prototype filter or not;

Mode 4: and alternative Mode 2 verifying the discrete orthogonality of OFDM/OM with polyphase filtering achieved by a trellis structure.

Methods for designing prototype filters illustrating these methods for achieving BFDM/OM and OFDM/OM modulations, are also shown.

The results shown notably illustrate:

the additional possibilities of BFDM/OM, so that the transmission delay remains adjustable for a given prototype filter length. For example, performances in terms of time-frequency localization of the transformation associated to the modulator may be enhanced for an identical transmission delay. With this, high performances may also be maintained from the point of view of selectivity while reducing the transmission delay;

in the case of so-called back-to-back systems, the possibility with modes 2 and 4 of totally cancelling out the interference between symbols (IES) and the interference between channels (IEC) and thereby obtaining what may also be called perfect reconstruction.

Other examples not reported here, also show that it is possible to obtain localization performances comparable to those of OFDM/OM, biorthogonally, and this with much shorter prototype filters. To facilitate interpretation, the following notations are retained: the sets, for example R the real number field, as well as vectors and matrices, for example E(z) and R(z), the polyphase matrices, are marked in bold characters. Otherwise, all the mathematical symbols used are marked in standard characters with generally the time functions in lower case, and the functions of transformed domains (both z- and Fourier-transformed) are in upper case.

1—Formulation as a Modulated Transmultiplexer 10

Figure 1:
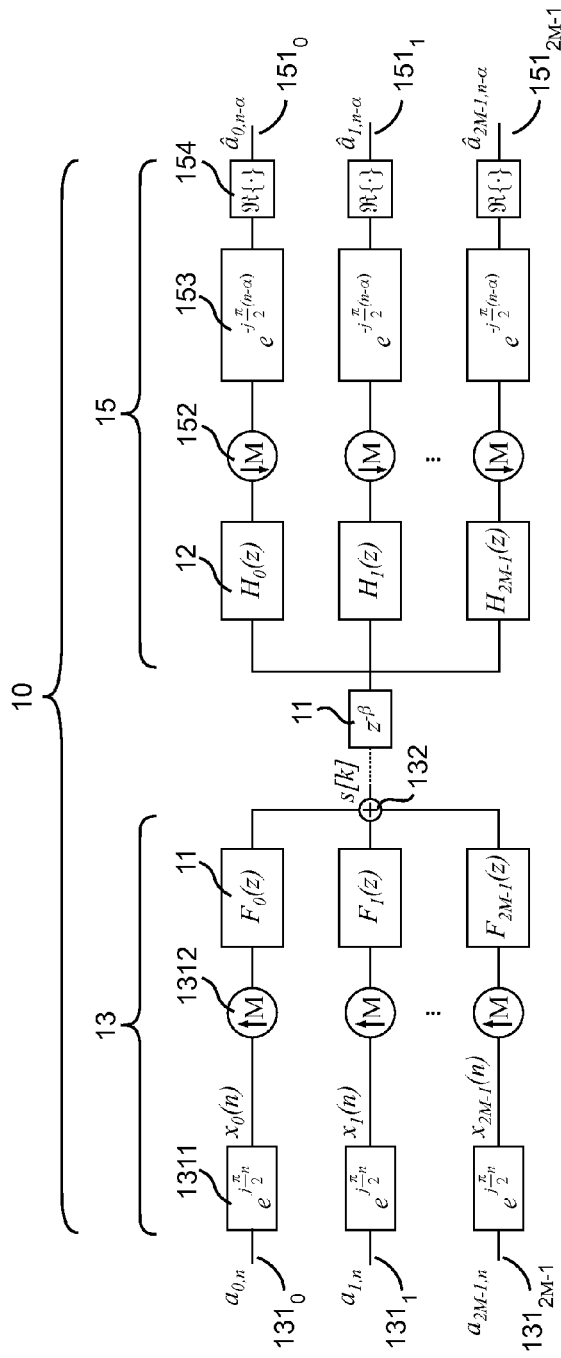
FIG. 1 illustrates the general structure of a transmultiplexer associated with BFDM/OM modulation, according to the invention.

Starting with a causal prototype filter p[k], derived from h(t) by translation and discretization, we obtain a realization scheme which is the one of FIG. 1.

The modulation part 13 comprises 2M branches $131_0$ to $131_{2M-1}$ receiving source data $a_{i,n}$. Each source data is multiplied by $$e^{j\frac{\pi}{2}}$$

(1311) to obtain $x_i(n)$, which feed an expander of order M 1312, and then a synthesis filter $F_i[z]$ 11.

The outputs of the synthesis filters feed an adder 132 to form a signal s sent through a channel 14. In the demodulation part 15, the signal s feeds 2M branches $151_0$ to $151_{2M-1}$ each comprising analysis filter $H_i[z]$ 12, a decimator of order M 152, a multiplication 153 by $$e^{j\frac{\pi}{2}(n-\alpha)}$$

and an extraction of the real part 154.

In this scheme, filters $F_i[z]$ 11 and $H_i[z]$ 12, with $0 \leq i \leq 2M-1$, are derived from p[k] (or P(z)) by complex modulation $\alpha$ and $\beta$, $0 \leq \beta \leq M-1$, are two integers which are related to a parameter D of the modulation $D=\alpha M-\beta$. The calculations by means of which this scheme may be achieved, are reported in Appendix B.

It may also be noted, that the prototype filters may be different. Subsequently, we will merely study the particular case when q[k]=p[d−k], without this limiting the scope of the patent application.

The realization of a modulation and demodulation scheme directly according to this FIG. 1 would be extremely costly, in terms of operative complexity.

According to the approach of the invention, the prototype filters P(z), are therefore broken down into their polyphase components $G_1(z)$ as shown in Appendix C.

Appendix C also specifies the input/output relationship, the conditions to be observed on the polyphase components and the construction delay.

2—Exemplary Embodiments

All the embodiments described later on are based on the implementation of a Discrete Fourier Transform (DFT).

Of course, this technique has the advantage that the DFT is expressed by fast computation algorithms, designated by their acronyms FFT, or IFFT for the inverse transform. (It shall be noted that the referenced equations (1) to (54) are found in Appendices A to C).

Let us write:

$$W^*_1 = \sqrt{2} \begin{pmatrix} 1 & & & 0 \\ & e^{-j\frac{2\pi}{2M}\frac{D+M}{2}} & & \\ & & \ddots & \\ 0 & & & e^{-j\frac{2\pi}{2M}(2M-1)\frac{D+M}{2}} \end{pmatrix} \quad (55)$$

$$W^*_2 = \sqrt{2} \begin{pmatrix} 1 & & & 0 \\ & e^{-j\frac{2\pi}{2M}\frac{D-M}{2}} & & \\ & & \ddots & \\ 0 & & & e^{-j\frac{2\pi}{2M}(2M-1)\frac{D-M}{2}} \end{pmatrix} \quad (56)$$

And W is the discrete Fourier transform of dimensions 2M×2M:

$$[W]_{k,l} = e^{-j\frac{2\pi}{2M}k,l}, \ 0 \le l, k \le 2M-1 \quad (57)$$

By using equations (35)-(38) (Appendix C), one obtains:

$$R(z^2) = \begin{pmatrix} 0 & & G_{2M-1}(z^2) \\ & \cdot^{\cdot^{\cdot}} & \\ G_0(z^2) & & 0 \end{pmatrix} W^* W^*_2 \quad (58)$$

$$E(z^2) = W^*_1 W^* \begin{pmatrix} G_0(z^2) & & 0 \\ & \ddots & \\ 0 & & G_{2M-1}(z^2) \end{pmatrix} \quad (59)$$

Figure 5:
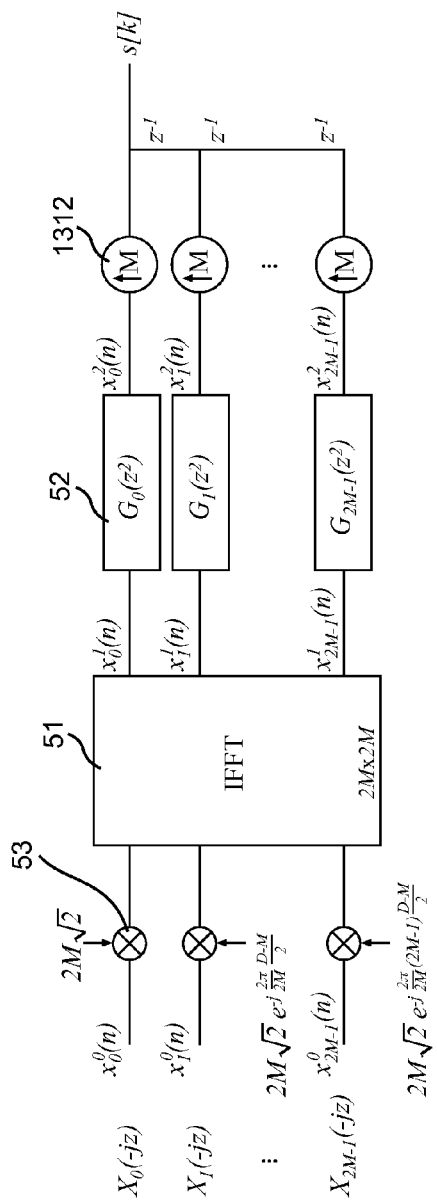
FIGS. 5 and 6 respectively show a BFDM/OM modulator and demodulator achieved by means of a reverse FFT.
Figure 6:
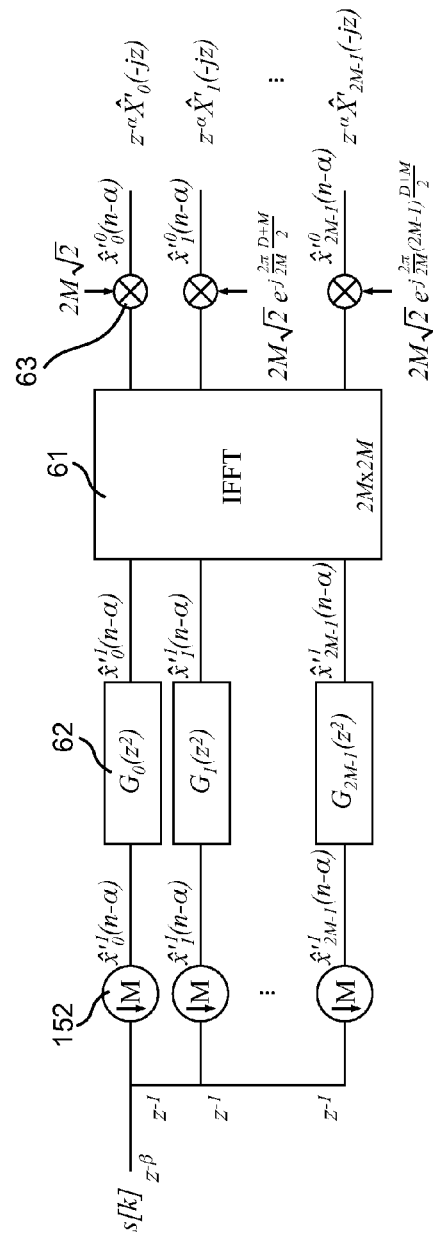

The schemes of the modulator of FIG. 5 and of the demodulator of FIG. 6 are derived from this, both achieved by means of an inverse Fourier transform IFFT 51, 61. In these FIGS. 5 and 6, s is an integer defined by D=2.s.M+d, d being an integer between 0 and 2M−1.

Data feeding each branch of the modulator of FIG. 5 are multiplied (53) by $$2M\sqrt{2}\ e^{-j\frac{2\pi}{2M}l\frac{D-M}{2}},$$

and then transformed through IFFT 51. The outputs of the IFFT feed polyphase components 52 (see Annex C) and expander 1312.

The received signal s(k) is directed to 2M branches (FIG. 6), each comprising a decimator 152 and a polyphase component 62, which feeds an IFFT 61. The 2M outputs of the IFFT comprise a multiplier 63

Of course, the notations and data appearing in FIGS. 5 and 6, as well as in the other figures, are a full part of the present description.

For the sake of simplification, but without any loss in generality, it is assumed hereafter that the prototype filter P(z) has a length of 2 mM so that all the polyphase components have the same length m.

2.1 Mode 1:IFFT Algorithm and Breakdown into Polyphase Components

Again using the notations of FIGS. 5 and 6, the following modulation and demodulation algorithms already mentioned above are derived:

2.1.1 Modulation Algorithm $$x^0_m(n) = a_{m,n} e^{j\frac{\pi}{2}n} \quad (60)$$

$$x^1_l(n) = \sqrt{2} \sum_{\lambda=0}^{2M-1} x^0_\lambda(n) e^{j\frac{2\pi}{2M}\lambda\frac{D-M}{2}} e^{j\frac{2\pi}{2M}kl} \quad (61)$$

$$= 2M\sqrt{2}\ \text{IFFT}\left(x^0_0(n), \ldots, x^0_{2M-1}(n) e^{-j\frac{2\pi}{2M}(2M-1)\frac{D-M}{2}}\right) \quad (62)$$

$$x^2_l(n) = \sum_{\lambda=0}^{m-1} p(l+2kM) x^1_\lambda(n-2k) \quad (63)$$

$$s[k] = \sum_{n=\lfloor\frac{\lambda}{M}\rfloor-1}^{\lfloor\frac{\lambda}{M}\rfloor} x^2_{\lambda-nM}(n) \quad (64)$$

2.1.2 Demodulation Algorithm $$\hat{x}'^2_l(n-\alpha) = s[nM-\beta-l] \quad (65)$$

$$\hat{x}'^1_l(n-\alpha) = \sum_{\lambda=0}^{m-1} p(l+2kM)\hat{x}'^2_l(n-\alpha-2k) \quad (66)$$

$$\hat{x}'^0_l(n-\alpha) = \sqrt{2}\ e^{-j\frac{2\pi}{2M}l\frac{D+M}{2}} \sum_{k=0}^{2M-1} \hat{x}'^1_l(n-\alpha) e^{j\frac{2\pi}{2M}kl} \quad (67)$$

$$= 2M\sqrt{2}\ e^{-j\frac{2\pi}{2M}l\frac{D+M}{2}}\ \text{IFFT}(\hat{x}'^1_l(n-\alpha), \ldots, \hat{x}'^1_{2M-1}(n-\alpha)) \quad (68)$$

$$\hat{a}_{mn-\alpha} = \Re\left\{e^{-j\frac{\pi}{2}(n-\alpha)}\hat{x}'^0_l(n-\alpha)\right\} \quad (69)$$

2.2 Mode 2: IFFT and Ladder Structure

Ladder schemes are a implementation means recently suggested for producing banks of filters. The inventors have mathematically validated their application to BFDM/OM, as described hereafter.

It is seen that a BFDM/OM modulation may be written as a transmultiplexer using two inverse FFTs (FIGS. 5 and 6), wherein the polyphase components of the used prototype appear explicitly. Each polyphase filter may then be written as a ladder. According to whether s is even or odd, filters $G_j(z)$ of FIGS. 5 and 6 may be replaced with the schemes given by FIGS. 7 and 8.

In order to achieve such schemes, a matrix breakdown of the polyphase components is implemented, which is based on 2×2 matrices, the number and nature of which are determined according to the desired prototype length and reconstruction delay.

Figure 7:
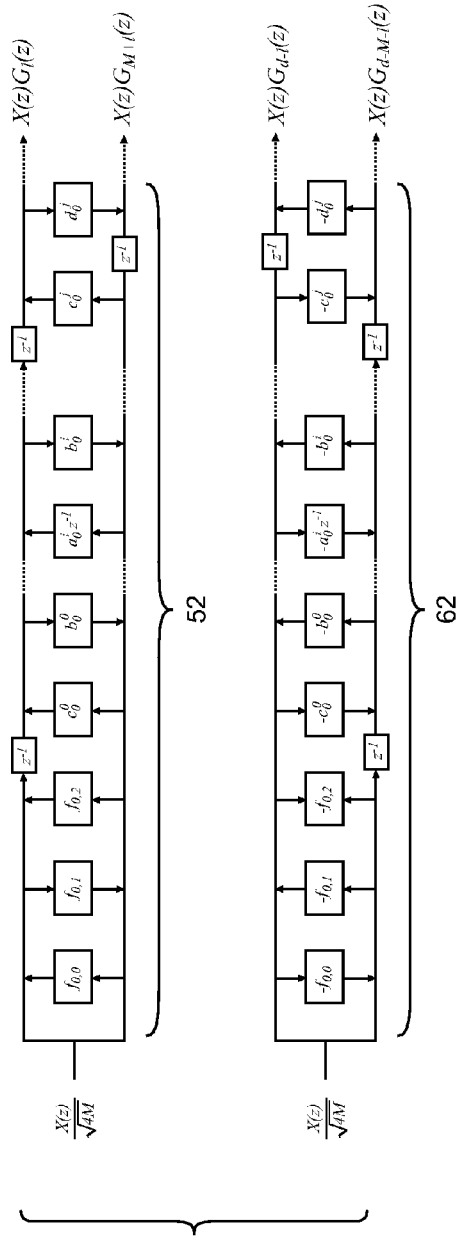
FIGS. 7 and 8 show ladder structure filters which may be used instead of the polyphase filters of FIGS. 5 and 6, respectively, when s, an integer parameter defined later on, is even or odd.
Figure 8:
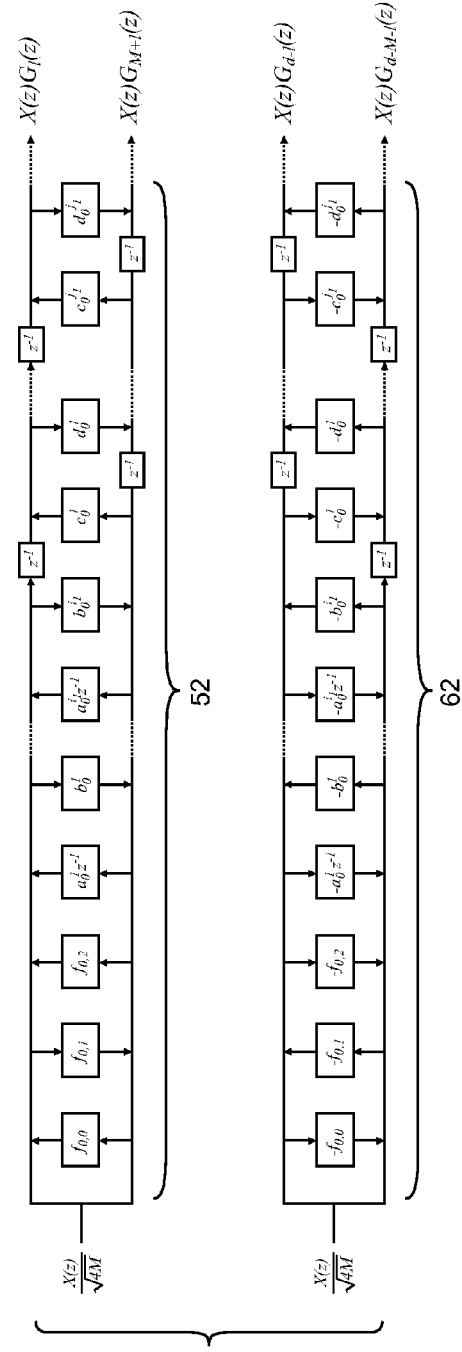
Figure 9:
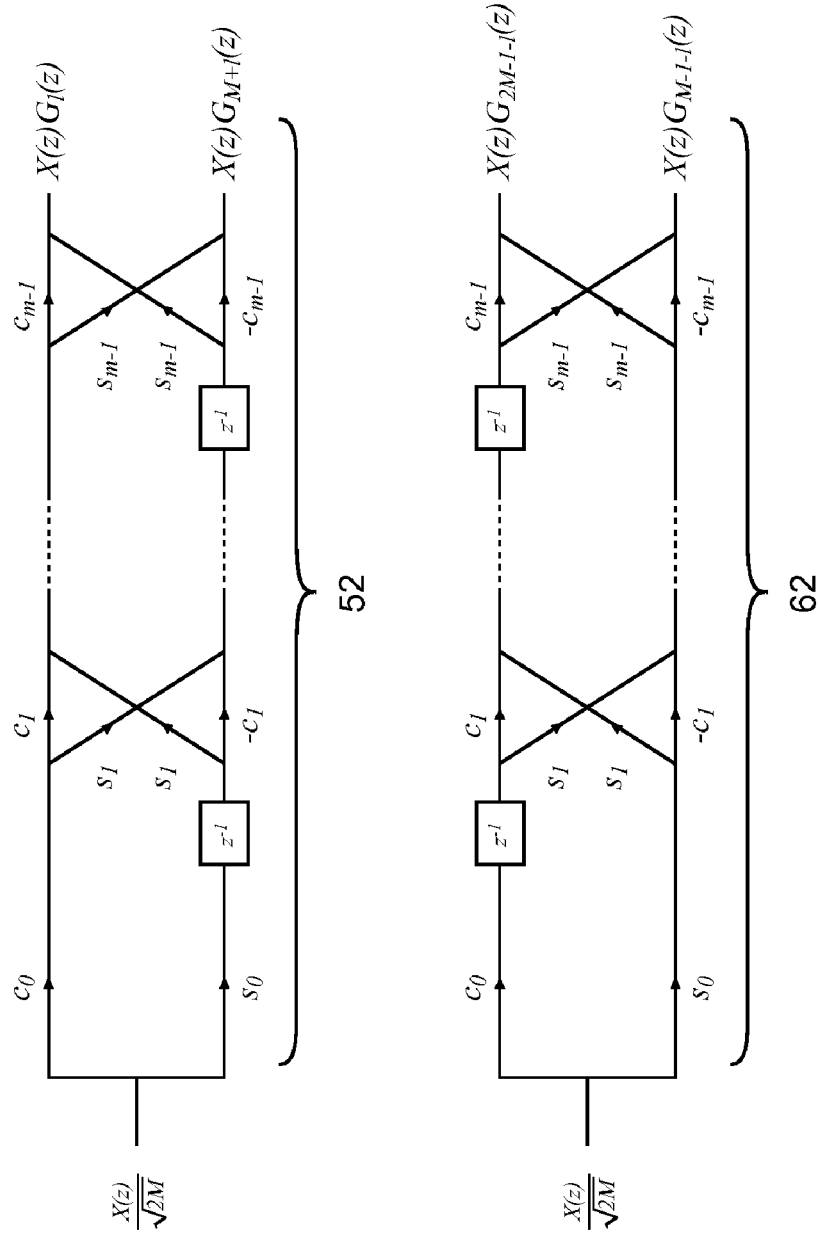
FIG. 9 illustrates a structure as a trellis for the polyphase filters of FIGS. 5 and 6, in the case of a OFDM/OM signal with symmetrical prototype filters.
Figure 10:
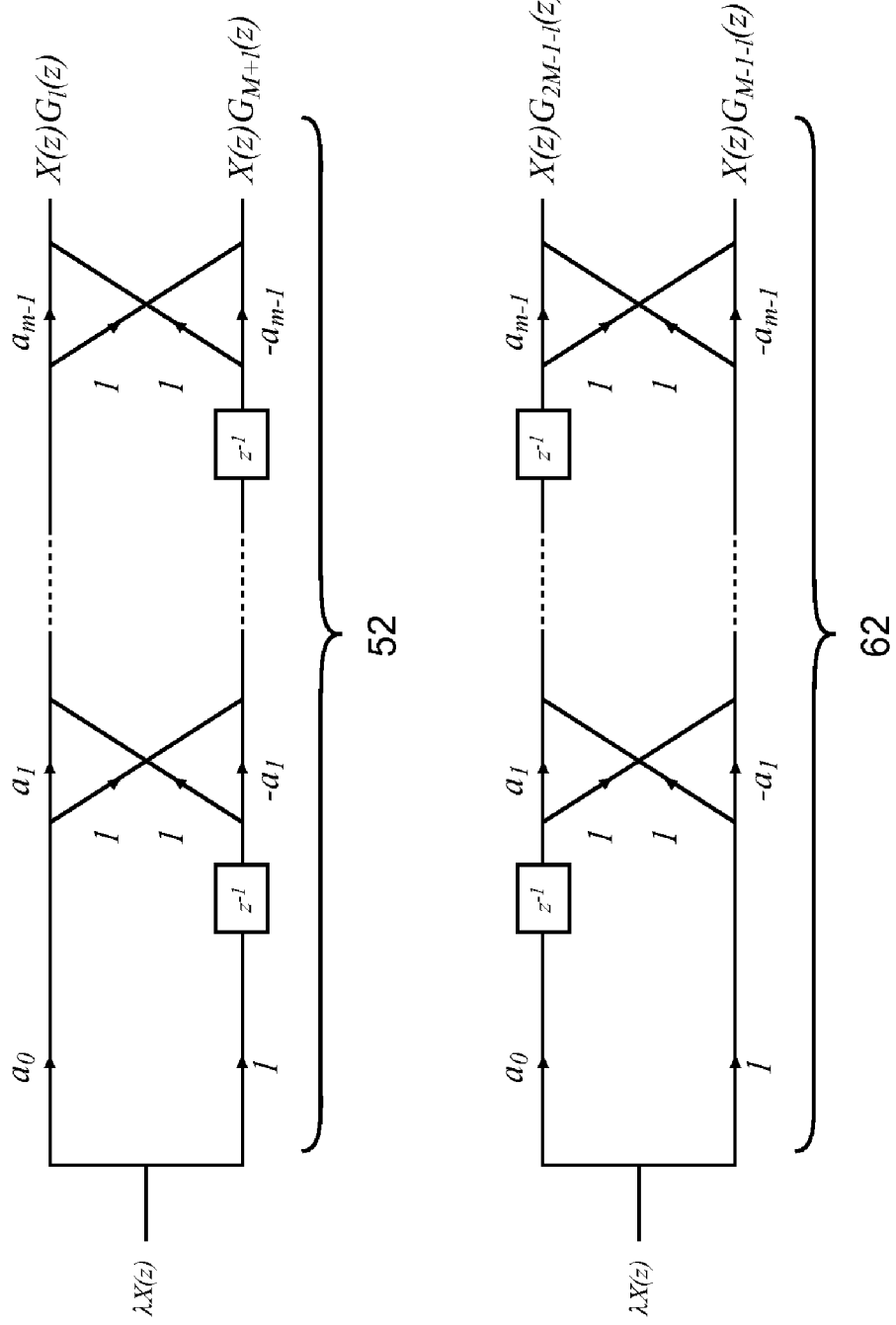
FIG. 10 shows a trellis according to FIG. 9, in the normalized case.

For example, in order to generate the pair of polyphase components $[G_1(z), G_{M+1}(z)]$, we proceed in two steps:

initialization is performed by a couple $(F_0, F_1)$ $F_0$ corresponds to a product of three matrices which will match the first three items of the upper schemes in FIGS. 7 and 8. The exact form of $F_1$ depends on the parity of parameter s. This is the identity matrix for even s (cf. upper scheme in FIG. 7) or this is a product of two matrices $C_0$ and $B_0$ for odd s, which will match the following two items in the upper scheme in FIG. 8. A prototype of length 2M (s=0) or 4M (s=1) is thereby obtained.

In order to increase the length of P(z), with or without increasing the delay, a set of matrices are then applied, which will be either (A,B), or (C,D) respectively. The continuation of the embodiment scheme is thereby obtained.

The same principle is applied to the polyphase components $[C_{d-1}(z), G_{d-M-1}(z)]$, this time taking the inverse matrices of the previous matrices.

An advantage of this structure is that it guarantees perfect reconstruction even in the presence of an error on the calculated coefficients, in particular in the presence of quantification errors.

Furthermore, this structure also facilitates optimization of the prototype filter, for example by considering a localization or frequency selectivity criterion: it is sufficient to optimize $([(M-1)/2]+1)(2m+1)=mM$ coefficients instead of 2 mM, without introducing any perfect reconstruction constraint.

3—Complexity of the Various Embodiments

In order to perform a comparison of the different embodiments provided, we shall place ourselves in the common case where N=2 mM. In this case each polyphase component has a length equal to m.

Each polyphase component may be produced as a transverse component, as a ladder component or in the orthogonal case, as a trellis component. Even if the ladders and the trellises have two outputs, only one may be exploited.

On each sub-band, the following operations are performed at the modulator:

premodulation (a phase shift, i.e. a complex multiplication);

an inverse Fourier transform;

polyphase filtering.

At the demodulator, the same operations are performed in the reverse order. Therefore, the complexity of the complete transmultiplexer with premodulation may be derived in terms of complex operations (Table 1) or real operations (Table 2).

TABLE 1

Number of complex operations per sub-band and per sample for the full transmultiplexer

|  | Complex additions | Complex multiplications |
|---|---|---|
| Transverse realization | $2m - 2 + 2\log_2 2M$ | $2m + 2 + 2\log_2 2M$ |
| Ladder realization | $4m + 2 + 2\log_2 2M$ | $4m + 2 + 2\log_2 2M$ |
| Trellis realization (normalized) | $4m - 4 + 2\log_2 2M$ | $4m + 2 + 2\log_2 2M$ |

TABLE 2

Number of real operations per sub-band and per sample for the modulator (or the demodulator)

|  | Real additions | Real multiplications |
|---|---|---|
| Transverse realization | $2m + 3\log_2 2M$ | $2m + 4 + 2\log_2 2M$ |
| Ladder realization | $4m + 4 + 3\log_2 2M$ | $4m + 6 + 2\log_2 2M$ |
| Trellis realization (normalized) | $4m + 3\log_2 2M$ | $4m + 4 + 2\log_2 2M$ |

The achieved gain with respect to direct realization of the scheme of FIG. 1 is therefore a net gain, as the latter would require 2 mM−1 complex additions and 2 mM+1 complex multiplications per sub-band and per sample, at both the modulator and the demodulator.

In terms of memory cells, 4M complex values must be stored in order to perform the premodulation, as well as the coefficients of the various structures. When the same filters upon transmission and reception are used, the first column of Table 3 is obtained. Moreover, in all cases, 4(m+1)M complex values must be stored in a buffer for the polyphase filtering both at the modulator and the demodulator.

TABLE 3

Real memory cells for the full modulator (or demodulator)

|  | ROM | RAM |
|---|---|---|
| Transverse realization | $2(m + 1)M + 2$ | $4(m + 3)M$ |
| Ladder realization | $(2m + 1)[((M - 1)/2) + 2M + 2]$ | $4(m + 3)M$ |
| Symmetrical transverse filter | $(m + 2)M + 2$ | $4(m + 3)M$ |
| Trellis realization (normalized) | $m[M/2] + 2M + 2$ | $4(m + 3)M$ |

The different techniques provided are notably characterized by the fact that for a modulator-demodulator system put "back-to-back", their IESs and IECs are exactly zero. Practically, because of the inaccuracy of the numerical calculation, they are generally of the order of $10^{-14}$.

In the case of modes 2 and 4, this perfect reconstruction characteristic is provided structurally, i.e. it is maintained after quantification of the ladder coefficients for BFDM/OM or trellis coefficients for OFDM/OM.

Two criteria may be taken into account for designing the prototype filters: localization and selectivity. Other aspects may also be taken into account, such as representative channel distortions of different transmission channels, for example of the mobile radio type.

As purely indicative examples, Tables 4 and 5 of the Appendix D give particular embodiments of the invention, the results of which are illustrated by FIGS. 11A, 11B, 12A and 12B.

Figure 11B:
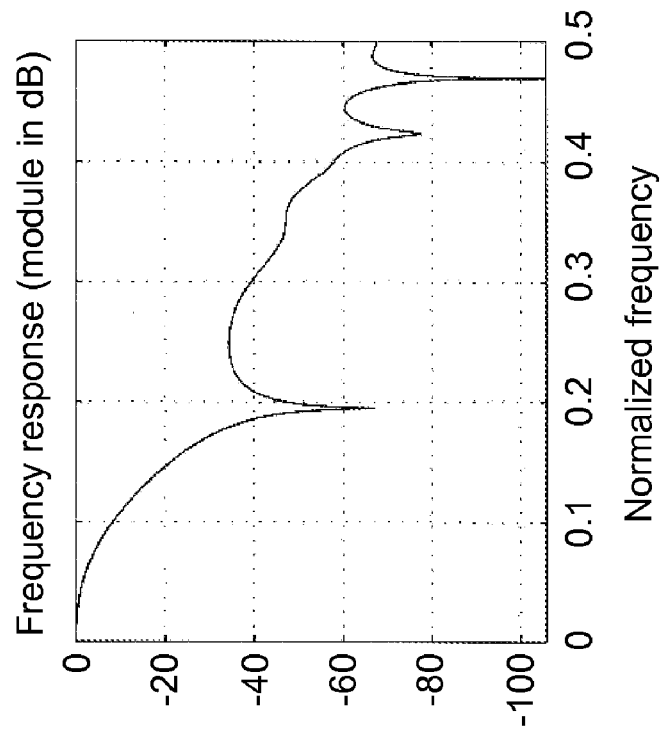
FIGS. 11A and 11B on the one hand and 12A and 12B on the other hand, illustrate the time and frequency responses obtained in two special embodiments, corresponding to the Tables of Appendix D.
Figure 11A:
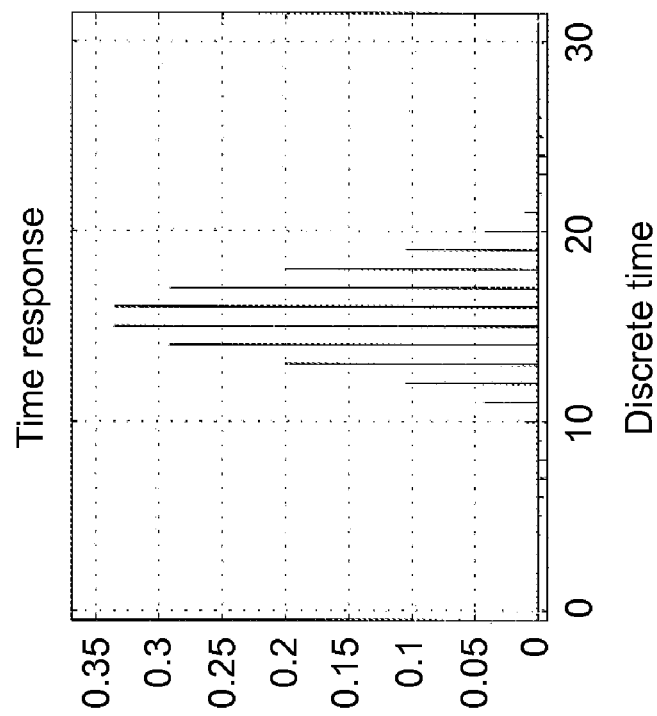

FIGS. 11A and 11B show the time response and the frequency response for a biorthogonal prototype with M=4, N=32, α=8, $\xi$=0.9799 (localization), $\xi_{mod}$=0.9851 (modified localization, according to Doroslovacki's criterion). They match the first column of Table 4 (transverse coefficients) and Table 5 (ladder coefficients).

Figure 12B:
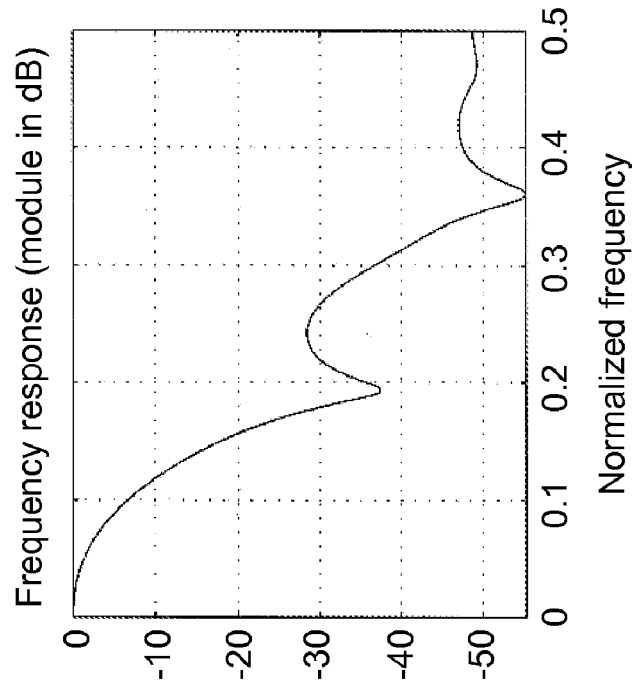
Figure 12A:
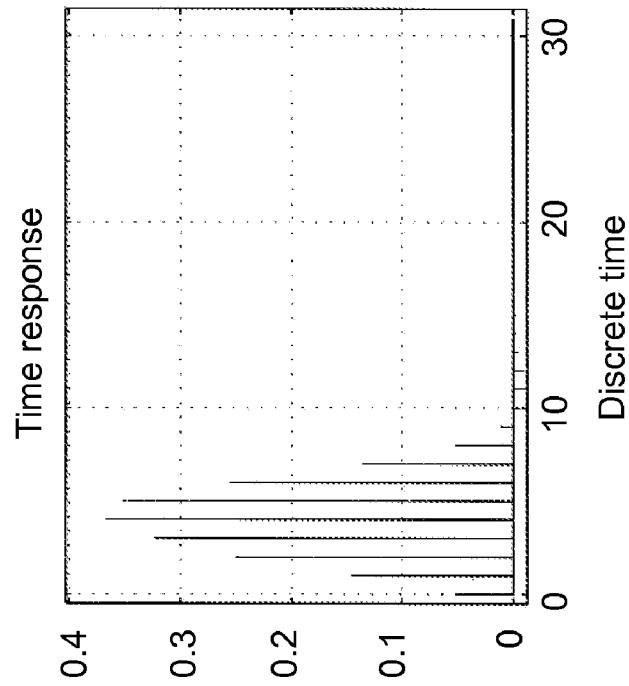

FIGS. 12A and 11B respectively show the time response and the frequency response for a biorthogonal prototype with M=4, N=32, α=2, $\xi$=0.9634 (localization), $\xi_{mod}$=0.9776 (modified localization, according to Doroslovacki's measurement). They match the second column of Table 4.

APPENDIX A

BFDM/OOAM Type Multicarrier Modulation

In this appendix, as an introduction to BFDM/OQAM modulations, a few essential definitions on biorthogonality ([16], [17], [18]) will be given as a reminder Let E be a vector space on a field K, the definitions and properties which we are going to use for generating a BFDM/OQAM modulation, may be summarized in the following way:

Definition A.1

Let $(x_i)_{i \in I}$ and $(\tilde{x}_i)_{i \in I}$ be two families of E vectors. $(x_i)_{i \in I}$ and $(\tilde{x}_i)_{i \in I}$ are biorthogonal if and only if $\forall (i,j) \in I^2$, $\langle x_i, \tilde{x}_j \rangle = \delta_{i,j}$ Definition A.2

Let $(x_i)_{i \in I}$ and $(\tilde{x}_i)_{i \in I}$ be two families of E vectors. $(x_i)_{i \in I}$ and $(\tilde{x}_i)_{i \in I}$ form a pair of biorthogonal bases of E if and only if:
- $(x_i)_{i \in I}$ and $(\tilde{x}_i)_{i \in I}$ form two bases of E
- $(x_i)_{i \in I}$ and $(\tilde{x}_i)_{i \in I}$ are two biorthogonal families Property A.1

Let $((x_i)_{i \in I}, (\tilde{x}_i)_{i \in I})$ be a pair of orthogonal bases of E, then $\forall x \in E$:

$$\chi = \sum_{i \in I} \langle \chi_i, \chi \rangle \tilde{\chi}_i = \sum_{i \in I} \langle \tilde{\chi}_i, \chi \rangle \chi_i$$

$$\chi = \sum_{i \in I} \alpha_i \chi_i, \text{alors} \, \alpha_i = \langle \tilde{\chi}_i, \chi \rangle$$

$$\chi = \sum_{i \in I} \tilde{\alpha}_i \tilde{\chi}_i, \text{alors} \, \tilde{\alpha}_i = \langle \chi_i, \chi \rangle$$

$$\|\chi\|^2 = \sum_{i \in I} \langle \chi_i, \chi \rangle * \langle \tilde{\chi}_i, \chi \rangle$$

A frequency-modulated complex signal on 2M sub-carriers may be written as $$s(t) = \sum_{n=-\infty}^{+\infty} \sum_{m=0}^{2M-1} a_{m,n} h(t - n\tau_0) e^{2j\pi(f_0 + m\nu_0)t} e^{j\varphi_{m,n}} \quad (1)$$

with:
$\alpha_{m,n} \in R$;
h is a real prototype filter with a bandwidth $v_0$ and a finite support: $h(t) \in [-T_1, T_2]$ with $T_1$ and $T_2$ real
$f_0 = 2$:

$$v_0 \tau_0 = \frac{1}{2}.$$

In order to obtain a biorthogonal modulation, we try to express s(t) with a couple of $(X_{m,n}, \tilde{X}_{m,n})$ biorthogonal bases:

$$s(t) = \sum_{n=-\infty}^{+\infty} \sum_{m=0}^{2M-1} a_{m,n} \chi_{m,n}(t) \quad (2)$$

with:

$$a_{m,n} = \Re\left\{\int_{-\infty}^{+\infty} s(t) \tilde{\chi}_{m,n}^*(t) \, dt\right\} = \langle s, \tilde{\chi}_{m,n} \rangle \quad (3)$$

Derivation of the expression of the associated discrete bases is shown is Appendix 2.

After translation by $T_1$ and discretization with a period $T_e = \tau_0/M = \frac{1}{2}Mv_0$, it is also possible, cf. Appendix 2, to define a pair of discrete biorthogonal bases such as $$s[k] = \sum_{n=-\infty}^{+\infty} \sum_{m=0}^{2M-1} a_{m,n} \chi_{m,n}[k] \quad (4)$$

$$a_{m,n} = \Re\left\{\sum_k s[k] \tilde{\chi}_{m,n}^*[k]\right\} = \langle s, \tilde{\chi}_{m,n} \rangle \quad (5)$$

with $$\chi_{m,n}[k] = (-1)^{mn} \sqrt{2} \, p[k - nM] e^{j\frac{2\pi}{2M}m(k-nM-\frac{D-M}{2})} \quad (6)$$

$$\tilde{\chi}_{m,n}[k] = (-1)^{mn} \sqrt{2} \, q[k - nM] e^{j\frac{2\pi}{2M}m(k-nM-\frac{D-M}{2})} \quad (7)$$

APPENDIX B

The BFDM/OOAM Transmultiplexer

General Biorthogonal Case

Let N be the length of the prototype filter p[k], such that:

$$2T = T_1 + T_2 = (N-1)T_e \quad (8)$$

and $T_1 = 2\lambda T$, $T_2 = 2(1-\lambda)T$ with $\lambda \in [0,1]$. Then:

$$s[k] = \sqrt{2} \sum_{n=-\infty}^{+\infty} \sum_{m=0}^{2M-1} a_{m,n}(-1)^{mn} \quad (9)$$

$$p[k - nM] \times e^{j\frac{2\pi}{2M}m(k-nM)} e^{j\left(\varphi_{m,n} - \frac{2\pi}{2M}m\lambda(N-1)\right)}$$

$$= \sqrt{2} \sum_{n=-\infty}^{+\infty} \sum_{m=0}^{2M-1} a_{m,n}(-1)^{mn} p[k - nM] \times \quad (10)$$

$$e^{j\frac{2\pi}{2M}m(k-nM-\frac{D-M}{2})} e^{j\left(\varphi_{m,n} + \frac{2\pi}{2M}m\left(\frac{D-M}{2} - \lambda(N-1)\right)\right)}$$

with D an arbitrarily set parameter and with which, as it will be seen, the reconstruction delay may be handled Considering equation (10), let us now set:

$$\varphi_{m,n} = n\frac{\pi}{2} - \frac{2\pi}{2M}\left(\frac{D-M}{2} - \lambda(N-1)\right) \quad (11)$$

$$x_m(n) = (-1)^{mn} e^{j\frac{\pi}{2}n} a_{m,n} \quad (12)$$

$$f_m(k) = \sqrt{2} \, p[k] e^{j\frac{2\pi}{2M}m(k-\frac{D-M}{2})} \quad (13)$$

so that $$s[k] = \sum_{n=-\infty}^{+\infty} \sum_{m=0}^{2M-1} x_m(n) f_m(k - nM) \quad (14)$$

Moreover, the demodulation dual base is written as:

$$\tilde{\chi}_{m,n}[k] = (-1)^{mn}\sqrt{2}\, q[k-nM] e^{j\frac{2\pi}{2M}m\left(k-nM-\frac{D-M}{2}\right)} e^{j\frac{\pi}{2}n} \quad (15)$$

$$\hat{a}_{m,n} = \Re\left\{(-1)^{mn}\sqrt{2}\sum_k s[k]q[k-nM]\times e^{-j\frac{2\pi}{2M}m\left(k-nM-\frac{D-M}{2}\right)} e^{-j\frac{\pi}{2}n}\right\} \quad (16)$$

$$= \Re\left\{(-1)^{mn}\sqrt{2} \sum_k s[D+nM-k]q[D-k]\times e^{-j\frac{2\pi}{2M}m\left(D-k-\frac{D-M}{2}\right)} e^{-j\frac{\pi}{2}n}\right\} \quad (17)$$

$$= \Re\left\{(-1)^{mn}\sqrt{2}\sum_k s[D+nM-k]q[D-k]\times e^{j\frac{2\pi}{2M}m\left(k-\frac{D+M}{2}\right)} e^{-j\frac{\pi}{2}n}\right\} \quad (18)$$

which leads us to put:

$$h_m(k) = \sqrt{2}\, q[D-k] e^{j\frac{2\pi}{2M}m\left(k-\frac{D+M}{2}\right)} \quad (19)$$

and $D=\alpha M-\beta$ with $\alpha$ and $\beta$ integers and $0 \leq \beta \leq M-1$ (20)

so that $$\hat{a}_{m,n-\alpha} = \Re\left\{(-1)^{m(n-\alpha)} e^{-j\frac{\pi}{2}(n-\alpha)} \sum_k s[nM-k-\beta] h_m(k)\right\} \quad (21)$$

The factor $(-1)^{mn}$ appears both in the modulator and the demodulator so it may be deleted without changing anything, and we are then led to the multiplexer scheme of FIG. 1.

Special Orthogonal Case

In the orthogonal case, we have $D=N-1$ and $q[k]=p[k]$, hence:

$$f_m(k) = \sqrt{2}\, p[k] e^{j\frac{2\pi}{2M}m\left(k-\frac{N-1}{2}\right)} e^{j\frac{\pi}{2}m} \quad (22)$$

$$h_m(k) = \sqrt{2}\, p[N-1-k] e^{j\frac{2\pi}{2M}m\left(k-\frac{N-1}{2}\right)} e^{-j\frac{\pi}{2}m} \quad (23)$$

If $q[k]=p[D-k]$, we then have $q[k]=p[N-1-k]$; the prototype is symmetrical. However, unlike what may often be read implicitly or explicitly ([4], [6], [7], [9]), the symmetry of the prototype is absolutely not required. To persuade ourselves that this is the case, we shall take one of the following prototypes and numerically check out (a direct check is rather tedious) that it provides perfect reconstruction for M=4 in the orthogonal case (we then have $N-1=D=7$, $\alpha=2$ and $D=1$):

$$P(z) = \frac{1}{4}(1 + z^{-1} + z^{-2} + z^{-3} - z^{-4} - z^{-5} - z^{-6} - z^{-7}) \quad (24)$$

$$P(z) = \frac{1}{4}(1 + z^{-1} - z^{-2} + z^{-3} + z^{-4} + z^{-5} - z^{-6} + z^{-7}) \quad (25)$$

It may even be checked that any prototype $P(z) = \sum_{n=0}^{7} p(n) z^{-n}$ which verifies (26) to (31) also provides perfect reconstruction for M=4 in the orthogonal case:

$c_0 = \pm 1, c_1 = \pm 1$ (26)

$\epsilon_0 = \pm 1, \epsilon_1 = \pm 1$ (27)

$$|p(0)| \leq \frac{\sqrt{2}}{4}, \quad |p(1)| \leq \frac{\sqrt{2}}{4} \quad (28)$$

$$p(2) = \varepsilon_1 \sqrt{\frac{1}{8} - p(1)^2}, \quad p(3) = \varepsilon_0 \sqrt{\frac{1}{8} - p(0)^2} \quad (29)$$

$$p(4) = c_0 \varepsilon_0 \sqrt{\frac{1}{8} - p(0)^2}, \quad p(5) = c_1 \varepsilon_1 \sqrt{\frac{1}{8} - p(1)^2} \quad (30)$$

$$p(6) = c_1 \varepsilon_1 p(1), \quad p(7) = c_0 \varepsilon_1 p(0) \quad (31)$$

APPENDIX C

The Biorthogonality Condition

The Polyphase Approach

Achieving modulation and demodulation schemes according to FIG. 1 would be extremely costly in terms of operating complexity. By breaking down the prototype P(z) into its polyphase components $G_l(z)$, such as $$P(z) = \sum_{l=0}^{2M-1} z^{-l} G_l(z^{2M}) \quad (32)$$

it is then possible to express the analysis and synthesis banks as:

$$H_m(z) = \sqrt{2} \sum_{l=0}^{2M-1} e^{j\frac{\pi}{M}m\left(l-\frac{D-M}{2}\right)} z^{-l} G_l(z^{2M}) \quad (33)$$

$$F_m(z) = \sqrt{2} \sum_{l=0}^{2M-1} e^{j\frac{\pi}{M}m\left(l-\frac{D-M}{2}\right)} z^{-l} G_l(z^{2M}) \quad (34)$$

From this, the expression for the polyphase matrices R(z) and E(z) of the banks of filters of the modulator and demodulator is thereby derived:

$$E(z^2) = W_1 \begin{pmatrix} G_0(z^2) & & 0 \\ & \ddots & \\ 0 & & G_{2M-1}(z^2) \end{pmatrix} \quad (35)$$

-continued $$R(z^2) = J\left[W_2\begin{pmatrix} G_0(z^2) & & 0 \\ & \ddots & \\ 0 & & G_{2M-1}(z^2) \end{pmatrix}\right]^T = \quad (36)$$

$$\begin{pmatrix} 0 & & G_{2M-1}(z^2) \\ & \ddots & \\ G_0(z^2) & & 0 \end{pmatrix} W_2^T \text{ where } J, W_1 \text{ and } W_{12}$$

are defined as below:

$$J = \begin{pmatrix} 0 & & 1 \\ & \ddots & \\ 1 & & 0 \end{pmatrix} \quad (37)$$

$$[W_1]_{k,l} = \sqrt{2}\, e^{\frac{j\pi}{M}k\left(l-\frac{D+M}{2}\right)}$$

$$[W_2]_{k,l} = \sqrt{2}\, e^{\frac{j\pi}{M}k\left(l-\frac{D-M}{2}\right)} \quad (38)$$

In order to isolate the transmultiplexer function, we introduce the following notation, wherein for convenience in writing, we shall no longer take $x_m(n)=j^n a_{m,n}$, but $x_m(n)=a_{m,n}$, in order to have:

$$\begin{cases} x_m(n) = a_{m,n} \\ \Re(\hat{x}'_m(n)) = \hat{x}_m(n) = \hat{a}_{m,n} \end{cases} \Rightarrow \begin{cases} X_m(-jz) \overset{TZ}{\leftrightarrow} j^n a_{m,n} \\ \hat{X}'_m(-jz) \overset{TZ}{\leftrightarrow} j^n \hat{x}'_m(n) \end{cases} \quad (39)$$

Figure 2:
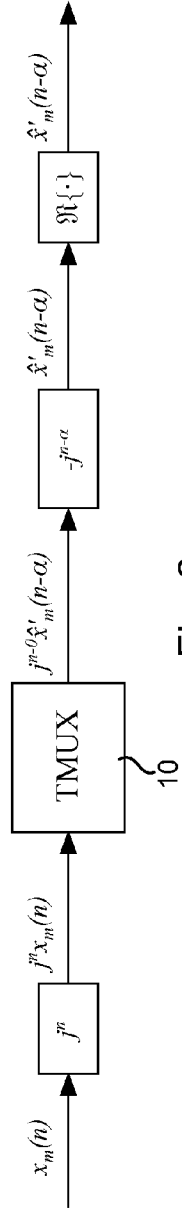
FIG. 2 in a simplified way, shows a global view of the chain implementing a transmultiplexer such as illustrated in FIG. 1.

↔ means related through a z-transform $x_m(n)$ represents the real symbols to be transmitted and $\hat{x}'_m(n)$ represents the complex symbols received after extraction of the real part. FIG. 2 gives a global view of the chain.

With the polyphase matrices $E(z^2)$ and $R(z^2)$, a polyphase form representation of the transmultiplexer (FIG. 3) may be obtained. Then, all we have to do is to take the real part of the output samples in $\hat{x}'_m(n-\alpha)$ order to reconstruct the input with a delay of $\alpha$ samples.

Input/Output Relationship

Let us note as $X(z)$, the vector which represents the transmitted data in the z-transformed domain. Upon reception, after demodulation, let us note as $\hat{X}'(-jz)$ the z-transform vector associated with the received data. Extraction of the real part then provides vector $\hat{X}(z)$. Now, our goal is:

to determine the input/output relationship, i.e. the relationship between $X(z)$ and $\hat{X}(z)$;
to determine the conditions on the polyphase components $G_1(z)$ of $P(z)$ for guaranteeing the equality:

$\hat{X}(z)=X(z)$;

to derive from the latter the construction delay $\alpha$.

Figure 4:
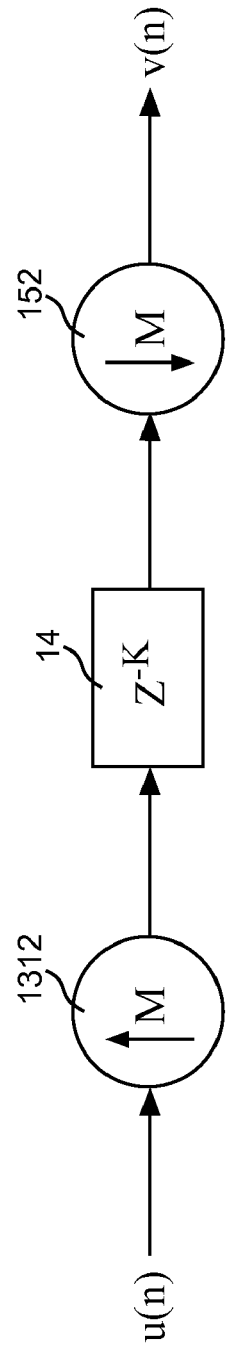
FIG. 4 illustrates, on an elementary case, the insertion of a delay operator placed between an expander and a decimator, used in the implementation of the polyphase representation of FIG. 3.

The 3 main items of this scheme for determining the input/output relationship are 2 polyphase matrices $E(z)$ and $R(z)$ as well as the transfer matrix $\Delta_\beta(z)$, connected to the expanders, delays and decimators. To determine the latter, the elementary case illustrated in FIG. 4 may serve as a basis, for which the transfer function is given by $$V(z) = \begin{cases} 0 & \text{if } K \text{ is not a multiple of } M \\ z^{-\frac{K}{M}}U(z) & \text{if } K \text{ is a multiple of } M \end{cases}$$

Figure 3:
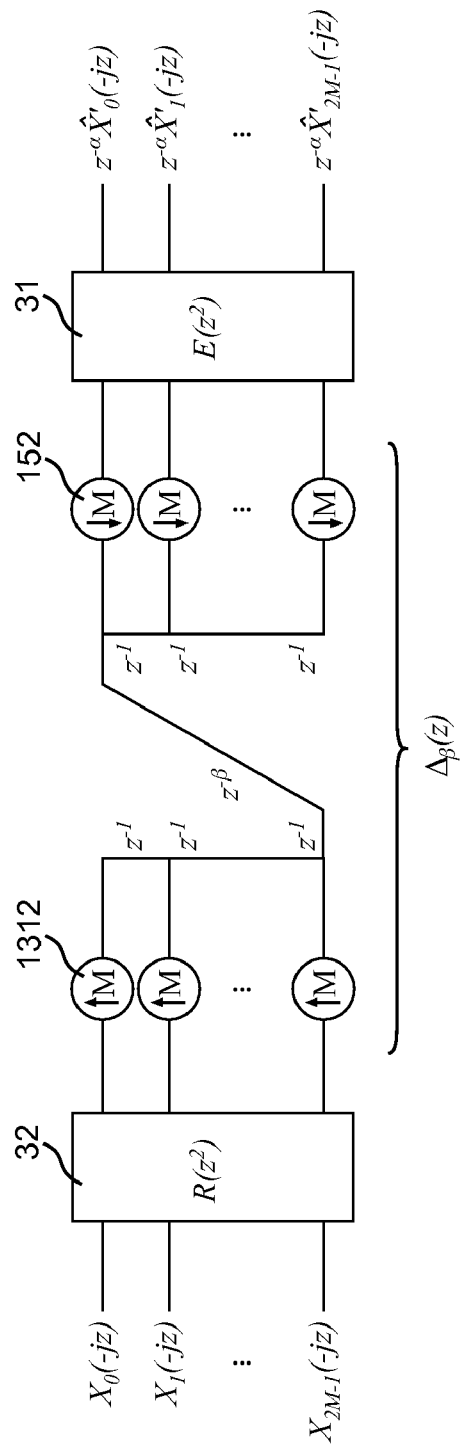
FIG. 3 is a representation in a polyphase form of the transmultiplexer of FIG. 1.

From FIG. 3, we then have:

$$z^{-\alpha}\hat{X}^1(-jz) = E(z^2)\Delta_\beta(z)R(z^2)X(-jz)$$

$$(jz)^{-\alpha}\hat{X}^1(z) = \overline{E}(-z^2)\Delta_\beta(jz)R(-z^2))X(z)$$

$$\hat{X}^1(z) = j^\alpha z^\alpha W_1 G(jz) W_2^T X(z) \quad (41)$$

where matrix $G(z)$ is defined below:

$$G(z) = \begin{pmatrix} G_0(z^2) & & 0 \\ & \ddots & \\ 0 & & G_{2M-1}(z^2) \end{pmatrix}\Delta_\beta(z)\begin{pmatrix} 0 & & G_{2M-1}(z^2) \\ & \ddots & \\ G_0(z^2) & & 0 \end{pmatrix} \quad (42)$$

We then have:

$$\hat{X}(z) = Q(z)X(z) \quad (43)$$

with:

$$Q(z) = \Re\{(jz)^\alpha W_1 G(jz) W_2^T\} \quad (44)$$

After a calculation, we obtain $$Q(z) = \begin{pmatrix} Q_0(z) & 0 & Q_1(z) & \cdots & Q_{M-1}(z) & 0 \\ 0 & Q_0(z) & 0 & Q_1(z) & & Q_{M-1}(z) \\ Q_1(z) & 0 & Q_0(z) & \ddots & \ddots & \vdots \\ \vdots & Q_1(z) & \ddots & \ddots & 0 & Q_1(z) \\ Q_{M-1}(z) & & \ddots & 0 & Q_0(z) & 0 \\ 0 & Q_{M-1}(z) & \cdots & Q_1(z) & 0 & Q_0(z) \end{pmatrix} \quad (45)$$

with:

$$Q_\xi(z) = 2(-1)^\xi \sum_{l=0}^{M-1} U_l(-z^2)\cos\left[\frac{2\pi}{M}\xi\left(l-\frac{d}{2}\right)\right] \quad (46)$$

The meaning of −d is specified later on. The exact expression for $U_l(-z^2)$ further depends on this parameter d (positive or zero integer), it may then be proved that perfect reconstruction is obtained if and only if:

si0≦d≦M−1:
if 0≦l≦d:

$$G_l(z)G_{d-l}(z) + z^{-1}G_{M+l}(z)G_{M+d-l}(z) = \frac{z^{-s}}{2M} - sid + 1 \le l \le M-1: \quad (47)$$

$$G_l(z)G_{2M+d-l}(z) + G_{M+l}(z)G_{M+d-l}(z) = \frac{z^{-(s-1)}}{2M} \quad (48)$$

if $M \leq d \leq 2M-1$:
 if $0 \leq l \leq d-M$:

$$G_l(z)G_{d-l}(z) + G_{M+l}(z)G_{d-M-l}(z) = \quad (49)$$

$$\frac{z^{-s}}{2M} \text{ if } d+1-M \leq l \leq M-1:$$

$$G_l(z)G_{d-l}(z) + z^{-1}G_{M+l}(z)G_{M+d-l}(z) = \frac{z^{-s}}{2M} \quad (50)$$

with d and s, integers defined by $D=2sM+d$, $s>0$ and $0 \leq d \leq 2M-1$. The reconstruction delay $\alpha$ is related to parameter s by the relationships:

$$\alpha = \begin{cases} 2s & \text{if } d=0 \\ 2s+1 & \text{if } d \in \{1, \ldots, M\} \\ 2(s+1) & \text{if } d \in \{M+1, \ldots, 2M-1\} \end{cases} \quad (51)$$

The special orthogonal case may be derived from this result, for which $D=N-1$, with N the length of the paraunitary prototype filter, i.e. a symmetrical filter here. P(z) is said to be paraunitary if:

$$P(z) = z^{-(N-1)}\tilde{P}(z) \text{ with } \tilde{P}(z) = P^*(z^{-1})$$

Indeed, it may verified that:

$$G_{d-l}(z) = z^{-s}\hat{G}_l(z) \text{ si } 0 \leq l \leq d \quad (52)$$

$$G_{2M+d-l} = z^{-(s-1)}\hat{G}_l(z) \text{ si } d+1 \leq l \leq 2M-1 \quad (53)$$

Thus, in the special orthogonal case, we have perfect reconstruction with a delay $$\alpha = \frac{N-1+\beta}{M},$$

if and only if:

$$G_l(z)\tilde{G}_l(z) + G_{l+M}(z)\tilde{G}_{M+l}(z) = \frac{1}{2M} \quad 0 \leq l \leq M-1 \quad (54)$$

APPENDIX D

Coefficients of the Prototype Filters Obtained by Optimization

TABLE 4

Biorthogonal prototypes with M = 4 and N = 32 (transverse coefficients)

| n | Examples from FIGS. 11A, 11B | Examples from FIGS. 12A, 12B |
|---|---|---|
| 0 | −4.460868105953324e−05 | 5.014949968230972e−02 |
| 1 | −8.827698704913472e−05 | 1.455583816489019e−01 |
| 2 | 1.816721975145588e−04 | 2.500737066757044e−01 |
| 3 | 2.302861759368111e−04 | 3.228805982747062e−01 |
| 4 | −1.172447599636272e−03 | 3.661515202615520e−01 |
| 5 | −1.027055790732281e−03 | 3.515099229023638e−01 |
| 6 | −3.760044826875730e−03 | 2.545572622632939e−01 |
| 7 | −6.052599354553620e−03 | 1.351315191913547e−01 |

TABLE 4-continued

Biorthogonal prototypes with M = 4 and N = 32 (transverse coefficients)

| n | Examples from FIGS. 11A, 11B | Examples from FIGS. 12A, 12B |
|---|---|---|
| 8 | −6.541334278009250e−03 | 5.168757567424829e−02 |
| 9 | −2.320957844665448e−03 | 1.125177964848224e−02 |
| 10 | 1.063973252261601e−02 | −4.802381010162210e−03 |
| 11 | 4.151536856291601e−02 | −1.106221296463278e−02 |
| 12 | 1.043838059706333e−01 | −8.872655589434630e−03 |
| 13 | 2.005189128209921e−01 | −3.753426678003194e−03 |
| 14 | 2.913131449163113e−01 | −1.654867643757010e−03 |
| 15 | 3.352627462532674e−01 | −1.383187971152199e−03 |
| 16 | 3.351172696026857e−01 | −3.813932123570836e−04 |
| 17 | 2.909415993397522e−01 | 5.624569918905843e−06 |
| 18 | 2.000454638421703e−01 | −2.475635347949224e−06 |
| 19 | 1.039959799288574e−01 | 4.952234305253537e−05 |
| 20 | 4.124129545474275e−02 | 2.048787314180216e−05 |
| 21 | 1.040407270162191e−02 | 1.004915620115845e−07 |
| 22 | −2.440939909195805e−03 | 4.423431446835775e−08 |
| 23 | −6.649467765409857e−03 | 2.649149072234273e−06 |
| 24 | −5.878063999471562e−03 | 1.785190585201287e−08 |
| 25 | −2.983359331348727e−03 | 6.863128678632993e−12 |
| 26 | −2.475652683945518e−03 | −3.021006714034441e−12 |
| 27 | −8.249232623G23326e 01 | −2.308376067571482e−09 |
| 28 | −8.891453128240245e−05 | 6.598349790230041e−12 |
| 29 | −4.464223698699074e−04 | −5.7894922?21665988e−16 |
| 30 | 3.704504269829711e−04 | −2.548414264695020e−16 |
| 31 | 1.247820119405080e−05 | 8.532126971482393e−13 |

TABLE 5

Biorthogonal prototype (ladder coefficients) with M = 4 and N = 32 and $\alpha$ = 8 (cf. FIGS. 11A, 11B)

| | l = 0 | l = 1 |
|---|---|---|
| $f_{0,0}$ | 2.820843813510179e−01 | 1.299280891559943e−01 |
| $f_{0,1}$ | −5.673498928902276e−01 | −3.310904763283146e−01 |
| $f_{0,2}$ | 3.721645241266496e−01 | −3.738170157940610e−02 |
| $c^0_0$ | −1.167480680205269e−01 | −2.847704852297620e−02 |
| $c^0_n$ | 1.064716331427927e−01 | −1.181506919769764e−01 |
| $a^1_0$ | −1.596131503239696e−01 | 9.127789670781532e−02 |
| $b^1_0$ | −2.626782049187459e+01 | −2.054722686392923e+01 |
| $c^1_0$ | −1.614447045462511e−04 | −3.551599154933042e−04 |
| $d^1_0$ | 2.628294699122717e+01 | 2.069686434312222e+01 |

APPENDIX E

References

[1] D. Pommier and Yi. Wu. Interleaving of spectrum-spreading in digital radio intended for vehicles. EBU *Rev.-Tech.*, (217):128-142, June 1986.

[2] L. Vandendorpe. Fractionnally spaced linear and decision feedback detectors for transmultiplexers. *IEEE Transactions on Signal Processing*, 46(4):996-1011, 1998.

[3] B. Le Floch, M. Alard, and C. Berrou. Coded Orthogonal Frequency Division Multiplex. *Proceedings of the IEEE*, 83:982-996, June 1995

[4] A. Vahlin and N. Holte. Optimal finite duration pulses for OFDM. *IEEE Trans. Communications*, 44 (1):10-14, January 1996.

[5] W. Kozek, A. F. Molish, and E. Bonek. Pulse design for robust multicarrier transmission over doubly dispersive channels. In *Proc. Int. Conf. on Telecommunications* (Porto Carras, Greece), volume 2, pages 313-317, June 1998.

[6] H. Boelcskei, P. Duhamel, and R. Hleiss. A design of pulse shaping OFDM/OQAM systems for wireless communications with high spectral efficiency. *Submitted to IEEE Transactions on Signal Processing*, November 1998

[7] H. Boelcskei, P. Duhamel, and R. Hleiss, "Design of pulse shaping OFDM/OQAM systems for high data-rate transmission over wireless channels". In *Proc. International Conference on Communications (ICC)*; Vancouver, June 1999.

[8] N. Lacaille. Relations bancs de filtres-modulations multiporteuses et application àl'OFDM/OQAM. Technical report, DEA, Universite de Rennes I, CNET/DMR, 1998.

[9] R. D. Koilpillai and P. P. Vaidyanathan. "Cosine-modulated FIR filter banks satisfying perfect reconstruction". *IEEE Transactions on Signal Processing*, 40(4):770-783, April 1992.

[10] T. Q. Nguyen and R. D. Koilpillai. The theory and design of arbitrary length cosine-modulated filter banks and wavelets satisfying perfect reconstruction. *IEEE Trans. Signal Processing*, SP-44(3):473-483, March 1996.

[11] Jalali Ali. "Etude et architecture d'un modem numérigue destiné aux modulations multiporteuses de densité2". PhD thesis, Universite de Rennes I, France, 1998.

[12] L. C. Calvez and P. Vilbé. On the uncertainty principle in discrete signals. *IEEE Trans.* Circuits and Systems-II, 39(6):394-395, June 1992.

[13] M. I. Doroslovacki Product of second moments in time and frequency for: discrete-time signals and the uncertainty limit. *Signal Processing*, 67 (1), May 1998.

[14] C. Roche and P. Siohan. A family of Extended Gaussian Functions with a nearly optimal localization property. In *Proc. First Int. Workshop on Multi-Carrier Spread-Spectrum* (Oberpfaffenhofen, Germany), pages 179-186, April 1997.

[15] P. Heller, T. Karp, and T. Q. Nguyen. A general formulation of modulated filter banks. *Submitted to IEEE Transactions on Signal Processing* 1996:

[16] M. Vetterli and J. Kovacevic "*Wavelets and Subband Coding*". Prentice Hall, 1995.

[17] H. G. Feichtinger et al. *Gabor Analysis and Algorithm—Theory and Applications*. Birkhäuser, Boston-Basel-Berlin, 1998.

[18] P. Flandrin. "*Temps-Frequence*". Hermès, 1998.

[19] I. Daubechies. The wavelet transform, time-frequency localization and signal analysis. *IEEE Trans. on Inf. Theory*, 36(5):961-1005, 1990.

[20] T. Karp and A. Mertins. "Lifting scheme for biorthogonal modulated filter banks". In *Proc. International Conference on Digital Signal Processing*, Santorini, Greece, July 1997.

[21] T. Karp and A. Mertins. "Efficient filter realizations for cosine modulated filter banks". In *Proc. Collogue GRETSI*, Grenoble, France, September 1997.

The invention claimed is:

1. A method for modulating a biorthogonal frequency division multiplex/offset modulation (BFDM/OM) biorthogonal multicarrier signal, wherein a bank of synthesis filters are implemented, having 2M parallel branches, wherein M is an integer parameter and M≧2, each branch of synthesis filters being fed by source data and each comprising an expander of order M and a synthesis filter, which is derived from a predetermined prototype modulation function, said method performing the following steps:

a multiplication by $$e^{j\frac{\pi}{2}n}$$

of each of said source data, providing multiplied source data;

applying a predetermined phase shift to each source data of a set of 2M multiplied source data, wherein said predetermined phase shift is D=αM−β, with α an integer representing a reconstruction delay and β an integer between 0 and M−1, implementing a reverse Fourier transform fed by the set of 2M source data having undergone the predetermined phase shift, feeding 2M synthesis filters with outputs of said reverse Fourier transform, expansion of order M of outputs of said synthesis filters, providing synthesis filter outputs, grouping said synthesis filter outputs, and transmitting the grouped synthesis filter outputs.

2. The transmission method according to claim 1, wherein said bank of synthesis filters is grouped as a polyphase matrix, respectively.

3. The transmission method according to claim 2, wherein at least one of said polyphase matrices comprises a reverse Fourier transform—with 2M inputs and 2M outputs.

4. The modulation method according to claim 1, wherein the method delivers data s[k] such that:

$$x_m^n(n) = a_{m,n} e^{j\frac{\pi}{2}n}$$

$$x_l^1(n) = \sqrt{2} \sum_{k=0}^{2M-1} x_k^0(n) e^{j\frac{2\pi}{2M}k\frac{D-M}{2}} e^{j\frac{2\pi}{2M}kl}$$

$$= 2M\sqrt{2}\, \text{IFFT}\left(x_0^0, \ldots, x_{2M-1}^0(n)e^{-j\frac{2\pi}{2M}(2M-1)\frac{D-M}{2}}\cdot\right)[l]$$

$$x_l^2(n) = \sum_{k=0}^{m=l} p(l+2kM)x_k^1(n-2k)$$

$$s[k] = \sum_{n=\left[\frac{k}{M}\right]-1}^{\left[\frac{k}{M}\right]} x_{k-nM}^2(n)$$

wherein D=αM−β with α an integer representing the reconstruction delay;

β an integer between 0 and M−1;

and [.] is the "integral part" function.

5. The method according to claim 1, wherein said biorthogonal multicarrier signal is an orthogonal frequency division multiplex/offset modulation (OFDM/OM) signal.

6. The modulation method according to claim 1, wherein said synthesis filters are produced as one of the filters belonging to the group comprising:

transverse structure filters;

ladder structure filters; and trellis structure filters.

7. The method according to claim 1, wherein said biorthogonal multicarrier signal is an OFDM/OM signal.

8. A method comprising demodulating a biorthogonal frequency division multiplex/offset modulation (BFDM/OM) biorthogonal multicarrier signal wherein a bank of analysis filters are implemented having 2M parallel branches, wherein M is an integer parameter and M≧2, each branch of analysis filters comprising a decimator of order M and an analysis filter, and delivering representative data received from source data, said analysis filter being derived from a predetermined prototype modulation function, and performing the following steps:

receiving of a transmitted signal made of inputs, grouping said inputs, decimation of order M of said inputs, feeding 2M analysis filters with an output of decimation of order M, feeding 2M phase shift multipliers with outputs of the 2M analysis filters, delivering phase-shifted outputs corresponding to a multiplication of said outputs of the 2M analysis filters by $$e^{-j\frac{2\pi}{2M}l\frac{D+M}{2}},$$

wherein D is a predetermined phase shift such as D=2.s.M+d, wherein s is an integer and d is an integer between 0 and 2M−1, implementing a reverse Fourier transform fed by 2M branches, themselves fed by said phase-shifted outputs, delivering an estimation of the source data.

9. The demodulation method according to claim 8, wherein the methods delivers data $\hat{a}_{m,n-\alpha}$ such that:

$$\hat{x}_l^2(n-\alpha) = s[nM - \beta - l]$$

$$\hat{x}_l'^1(n-\alpha) = \sum_{k=0}^{m-1} p(l+2kM)\hat{x}_l'^2(n-\alpha-2k)$$

$$\hat{x}_l'^0(n-\alpha) = \sqrt{2}\, e^{-j\frac{2\pi}{2M}l\frac{D+M}{2}} \sum_{k=0}^{2M-1} \hat{x}_l'^1(n-\alpha)e^{j\frac{2\pi}{2M}kl}$$

$$= 2M\sqrt{2}\, e^{-j\frac{2\pi}{2M}l\frac{D+M}{2}} \mathrm{IFFT}(\hat{x}_l'^1(n-\alpha), \ldots, \hat{x}_{2M-1}'^1(n-\alpha))[l]$$

$$\hat{a}_{m,n-\alpha} = \Re\{e^{-j\frac{\pi}{2}(n-\alpha)}\hat{x}_l'^0(n-\alpha)\}$$

with: D=2.s.M+d, wherein: s is an integer;

d is between 0 and 2M−1.

10. The demodulation method according to claim 8, wherein said filtering modules are produced as one of the filters belonging to the group comprising:

transverse structure filters;

ladder structure filters; and trellis structure filters.

11. The modulation method according to claim 8, wherein said biorthogonal multicarrier signal is a OFDM/OM signal.

12. The transmission method according to claim 8, wherein said bank of analysis filters is grouped as a polyphase matrix, respectively.

13. The method according to claim 8, wherein said biorthogonal multicarrier signal is an orthogonal frequency division multiplex/offset modulation (OFDM/OM) signal.

14. Apparatus comprising:

a modulating device for modulating a biorthogonal frequency division multiplex/offset modulation (BFDM/OM) biorthogonal multicarrier signal, comprising a bank of synthesis filters having 2M parallel branches, wherein M is an integer parameter and M≧2, each branch of synthesis filters being fed by source data and each comprising an expander of order M and a synthesis filter, which is derived from a predetermined prototype modulation function, and performing:

a multiplication by $$e^{j\frac{\pi}{2}n}$$

of each of said source data, providing multiplied source data;

applying a predetermined phase shift to each source data of a set of 2M multiplied source data, wherein said predetermined phase shift is D=αM−β, with α an integer representing a reconstruction delay and β an integer between 0 and M−1, reverse Fourier transform fed by the set of 2M source data having undergone the predetermined phase shift, feeding 2M synthesis filters with the outputs of said reverse Fourier transform, expansion of order M of the outputs of said synthesis filters, providing outputs, grouping said outputs, and transmitting the grouped outputs.

15. The apparatus according to claim 14, further including a demodulation device for demodulating a BFDM/OM biorthogonal multicarrier signal and comprising:

a bank of analysis filters having 2M parallel branches, each comprising an expander of order M and an analysis filter, and delivering representative data received from source data, said analysis filter being derived from a predetermined prototype modulation function and performing:

receiving of a transmitted signal made of inputs, grouping said inputs, decimation of order M of said inputs, feeding 2M analysis filters with an output of decimation of order M, feeding 2M phase shift multipliers with outputs of the 2M analysis filters, delivering phase-shifted outputs corresponding to a multiplication of said outputs of the 2M analysis filters by $$e^{-j\frac{2\pi}{2M}l\frac{D+M}{2}},$$

wherein D is a predetermined phase shift such as D=2.s.M+d, wherein s is an integer and d is an integer between 0 and 2M−1, reverse Fourier transform fed by 2M branches, themselves fed by said phase-shifted outputs, delivering an estimation of the source data.

16. A demodulation device for demodulation a biorthogonal frequency division multiplex/offset modulation (BFDM/OM) biorthogonal multicarrier signal comprising:

a bank of analysis filters having 2M parallel branches, each branch of the bank of analysis filters comprising a decimator of order M and an analysis filter, and delivering representative data received from source data, said analysis filter being derived from a predetermined prototype modulation function, and performing:

receiving of a transmitted signal made of inputs, grouping said inputs, decimation of order M of said inputs, feeding 2M analysis filters with the output of decimation of order M, feeding 2M phase shift multipliers with the outputs of the 2M analysis filters, delivering phase-shifted outputs corresponding to a multiplication of said outputs of the 2M analysis filters by $$e^{-j\frac{2\pi}{2M}l\frac{D+M}{2}},$$

wherein D is a predetermined phase shift such as D=2.s.M+d, wherein s is an integer and d is an integer between 0 and 2M−1, reverse Fourier transform fed by 2M branches, themselves fed by said phase-shifted outputs, delivering an estimation of the source data.

* * * * *

UNITED STATES PATENT AND TRADEMARK OFFICE
CERTIFICATE OF CORRECTION

PATENT NO. : 7,609,611 B1
APPLICATION NO. : 10/089026
DATED : October 27, 2009
INVENTOR(S) : Siohan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2062 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,609,611 B1 | Page 1 of 3 |
| APPLICATION NO. | : 10/089026 | |
| DATED | : October 27, 2009 | |
| INVENTOR(S) | : Pierre Siohan et al. | |

It is certified that error appears in the above-identified patent and that said Letters Patent is hereby corrected as shown below:

In the Specification

Column 7:

At line 19, delete " $W^{*}_{1} = \sqrt{2}$ " and insert -- $W_{1} = \sqrt{2}$ --

At line 25, delete " $W^{*}_{1} = \sqrt{2}$ " and insert -- $W_{1} = \sqrt{2}$ --

Column 13:

At line 66, delete " $P(z) = \sum_{n=0}^{Y} p(n)z^{-n}$ " and insert -- $P(z) = \sum_{n=0}^{Y} p(n)z^{-n}$ --

Column 14:

In equation no. (35), delete " $E(z^2) = W_1 \begin{pmatrix} G_0(z^2) & & 0 \\ & \ddots & \\ 0 & & G_{2M-1}(z^2) \end{pmatrix}$ "

and insert -- $E(z^2) = W_1 \begin{pmatrix} G_0(z^2) & & 0 \\ & \ddots & \\ 0 & & G_{2M-1}(z^2) \end{pmatrix}$ --

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 7,609,611 B1

Column 15:

In equation no. (36), delete

"$$R(z^2) = J\left[W_2 \begin{pmatrix} G_0(z^2) & & 0 \\ & \ddots & \\ 0 & & G_{2M-1}(z^2) \end{pmatrix}\right]^T = \begin{pmatrix} 0 & & G_{2M-1}(z^2) \\ & \ddots & \\ G_0(z^2) & & 0 \end{pmatrix} W_2^T$$" and insert --$$R(z^2) = J\left[W_2 \begin{pmatrix} G_0(z^2) & & 0 \\ & \ddots & \\ 0 & & G_{2M-1}(z^2) \end{pmatrix}\right]^T = \begin{pmatrix} 0 & & G_{2M-1}(z^2) \\ & \iddots & \\ G_0(z^2) & & 0 \end{pmatrix} W_2^T$$--

In equation no. (37), delete "$J = \begin{pmatrix} 0 & & 1 \\ & \ddots & \\ 1 & & 0 \end{pmatrix}$" and insert -- $J = \begin{pmatrix} 0 & & 1 \\ & \iddots & \\ 1 & & 0 \end{pmatrix}$ --

Column 16:

In equation no. (42), delete

"$$G(z) = \begin{pmatrix} G_0(z^2) & & 0 \\ & \ddots & \\ 0 & & G_{2M-1}(z^2) \end{pmatrix} \Delta_\beta(z) \begin{pmatrix} 0 & & G_{2M-1}(z^2) \\ & \ddots & \\ G_0(z^2) & & 0 \end{pmatrix}$$" and insert --$$G(z) = \begin{pmatrix} G_0(z^2) & & 0 \\ & \ddots & \\ 0 & & G_{2M-1}(z^2) \end{pmatrix} \Delta_\beta(z) \begin{pmatrix} 0 & & G_{2M-1}(z^2) \\ & \iddots & \\ G_0(z^2) & & 0 \end{pmatrix}$$--

In equation no. (45), delete

"$$Q(z) = \begin{pmatrix} Q_0(z) & 0 & Q_1(z) & \cdots & Q_{M-1}(z) & 0 \\ 0 & Q_0(z) & 0 & Q_1(z) & & Q_{M-1}(z) \\ Q_1(z) & 0 & Q_0(z) & \iddots & \iddots & \vdots \\ \vdots & Q_1(z) & \iddots & \iddots & 0 & Q_1(z) \\ Q_{M-1}(z) & & \iddots & 0 & Q_0(z) & 0 \\ 0 & Q_{M-1}(z) & \cdots & Q_1(z) & 0 & Q_0(z) \end{pmatrix}$$" and insert $$Q(z) = \begin{pmatrix} Q_0(z) & 0 & Q_1(z) & \cdots & Q_{M-1}(z) & 0 \\ 0 & Q_0(z) & 0 & Q_1(z) & & Q_{M-1}(z) \\ Q_1(z) & 0 & Q_0(z) & & \ddots & \vdots \\ \vdots & Q_1(z) & \ddots & \ddots & 0 & Q_1(z) \\ Q_{M-1}(z) & & \ddots & 0 & Q_0(z) & 0 \\ 0 & Q_{M-1}(z) & \cdots & Q_1(z) & 0 & Q_0(z) \end{pmatrix}$$

In equation no. (47), delete

" $G_l(z)G_{d-l}(z) + z^{-1}G_{M+l}(z)G_{M+d-l}(z) = \dfrac{z^{-s}}{2M} - si\, d+1 \leq l \leq M-1$ "

$$G_l(z)G_{d-l}(z) + z^{-1}G_{M+l}(z)G_{M+d-l}(z) = \dfrac{z^{-s}}{2M}$$

and insert -- $-si\, d+1 \leq l \leq M-1$ --

Column 17:

At lines 5-7 (equation no. (49)), delete " $G_l(z)G_{d-l}(z) + G_{M+l}(z)G_{d-M-l}(z) = \dfrac{z^{-s}}{2M}$ - if $d+1-M \leq l \leq M-1$:"

and insert -- $G_l(z)G_{d-l}(z) + G_{M+l}(z)G_{d-M-l}(z) = \dfrac{z^{-s}}{2M}$

- if $d+1-M \leq l \leq M-1$: --

In equation no. (52), delete " $G_{d-l}(z) = z^{-s}\hat{G}_l(z) \quad si\, 0 \leq l \leq d$ "

and insert -- $G_{d-l}(z) = z^{-s}\tilde{G}_l(z) \quad si\, 0 \leq l \leq d$ --

In equation no. (53), delete " $G_{2M+d-l} = z^{-(s-1)}\hat{G}_l(z)\, si\, d+1 \leq 2M-1$ "

and insert -- $G_{2M+d-l} = z^{-(s-1)}\tilde{G}_l(z)\, si\, d+1 \leq 2M-1$ --